(12) United States Patent
    Word

(10) Patent No.: US 11,178,193 B2
(45) Date of Patent: *Nov. 16, 2021

(54) DETERMINING FEATURE UNAVAILABILITY

(71) Applicant: Amazon Technologies, Inc., Seattle, WA (US)

(72) Inventor: Jonathan Brian Word, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 445 days.

This patent is subject to a terminal disclaimer.

(21) Appl. No.: 15/996,276

(22) Filed: Jun. 1, 2018

(65) Prior Publication Data

US 2018/0278658 A1    Sep. 27, 2018

Related U.S. Application Data

(63) Continuation of application No. 14/228,762, filed on Mar. 28, 2014, now Pat. No. 9,992,237.

(51) Int. Cl.
    *H04L 29/06*    (2006.01)

(52) U.S. Cl.
    CPC ...... *H04L 65/1069* (2013.01); *H04L 65/4084* (2013.01)

(58) Field of Classification Search
    CPC . H04L 12/5601; H04L 43/0882; H04L 47/10; H04L 47/12; H04L 47/2408; H04L 47/283; H04L 49/602; H04L 45/10; H04L 45/22; H04L 45/26; H04L 45/30; H04L 49/1515; H04L 49/25; H04L 49/357; H04L 49/50; H04L 65/1069; H04L 65/4084; H04L 67/32
    See application file for complete search history.

(56) References Cited

U.S. PATENT DOCUMENTS

| | | |
|---|---|---|
| 6,173,322 B1 | 1/2001 | Hu |
| 6,463,062 B1 | 10/2002 | Buyukkoc et al. |
| 7,130,868 B2 | 10/2006 | Ito et al. |
| 8,208,403 B2 | 6/2012 | Sarkar et al. |
| 8,737,225 B2 | 5/2014 | Jia et al. |
| 8,745,221 B1 | 6/2014 | Willbanks |
| 9,027,036 B2 | 5/2015 | Shokawa |
| 9,455,897 B2 | 9/2016 | Krishnaswamy et al. |
| 2004/0010617 A1 | 1/2004 | Akahane et al. |

(Continued)

OTHER PUBLICATIONS

Wikipedia, "IEEE 802.11," page last modified Feb. 7, 2017, retrieved Feb. 13, 2017, from https://en.wikipedia.org/wiki/IEEE_802.11, 9 pages.

(Continued)

*Primary Examiner* — Kevin T Bates
*Assistant Examiner* — Ranjan Pant
(74) *Attorney, Agent, or Firm* — Davis Wright Tremaine LLP

(57) ABSTRACT

Method and apparatus for determining feature unavailability are disclosed. In the method and apparatus a user device attempts to communicate with a second server over a second network path whereby the communication may be blocked. The user device receives data from a first server over a first network path whereby the data indicates that communication using the second network path may be blocked.

20 Claims, 9 Drawing Sheets

(56) References Cited

U.S. PATENT DOCUMENTS

| | | |
|---|---|---|
| 2004/0234937 A1 | 11/2004 | Watanabe |
| 2005/0125528 A1 | 6/2005 | Burke et al. |
| 2006/0190585 A1* | 8/2006 | Shokawa .............. H04W 24/00 709/223 |
| 2007/0053334 A1* | 3/2007 | Sueyoshi ............ H04L 12/2856 370/338 |
| 2008/0062891 A1 | 3/2008 | Van der Merwe et al. |
| 2008/0095339 A1 | 4/2008 | Elliott et al. |
| 2009/0168786 A1* | 7/2009 | Sarkar ................. H04L 41/5054 370/396 |
| 2009/0279556 A1 | 11/2009 | Selitser et al. |
| 2010/0057748 A1 | 3/2010 | Ensor et al. |
| 2011/0231898 A1 | 9/2011 | Tovar |
| 2012/0023131 A1* | 1/2012 | Downey ................. G06F 16/48 707/769 |
| 2012/0137096 A1 | 5/2012 | Maki et al. |
| 2013/0094445 A1* | 4/2013 | De Foy ................. H04L 45/021 370/328 |
| 2013/0215789 A1 | 8/2013 | Lim et al. |
| 2014/0128030 A1 | 5/2014 | Milstein |
| 2014/0250169 A1 | 9/2014 | Lowery et al. |
| 2014/0359064 A1 | 12/2014 | Rizzo et al. |
| 2015/0074286 A1 | 3/2015 | Anschutz |
| 2015/0113156 A1 | 4/2015 | Smith |
| 2016/0330287 A1* | 11/2016 | Smith ................. H04L 12/2812 |

OTHER PUBLICATIONS

Wikipedia, "IEEE 802.16," page last modified Nov. 21, 2016, retrieved Feb. 13, 2017, from https://en.wikipedia.org/wiki/IEEE_802.16, 8 pages.

Wikipedia, "IEEE 802.21," page last modified Aug. 4, 2016, retrieved Feb. 13, 2017, from https://en.wikipedia.org/wiki/IEEE_802.21, 3 pages.

* cited by examiner ns. However, it will also be

DETERMINING FEATURE UNAVAILABILITY

CROSS REFERENCE TO RELATED APPLICATION

This application is a continuation of U.S. patent application Ser. No. 14/228,762, filed Mar. 28, 2014, entitled "DETERMINING FEATURE UNAVAILABILITY," the disclosure of which is hereby incorporated herein in its entirety.

BACKGROUND

Client-server communications, among other types of communications, may oftentimes be partially controlled or otherwise affected by third-parties to the communications. For example, communications between a user device, such as a smartphone, and a web server may be subject to restrictions placed by an Internet service provider or a wireless carrier. The third-parties may have various devices that are placed on a communication path between the client and the server. For example, third-party controlled routers may be used to route traffic between the user device and the web server. The third-parties may leverage their partial control or ownership of the communications link to enforce various policies. For example, a third-party may enforce bandwidth usage restrictions on data exchanged between a user device and a web server. The restrictions may cause some features that are sought by clients to become unavailable.

Accordingly, it is often challenging to provide a client with detailed information specifying a reason behind certain features being unavailable to the client. Typically, users affected by policy enforcement are subject to poor performance without knowing whether the poor performance is due to a temporary glitch, whether the poor performance is due to the user's device or another device and, generally, what actions, if any, can or should be taken. It is also challenging to provide the information when a communication link used by the client is subject to being blocked by a third-party actor.

BRIEF DESCRIPTION OF THE DRAWINGS

Various embodiments in accordance with the present disclosure will be described with reference to the drawings, in which.

DETAILED DESCRIPTION

Figure 1:
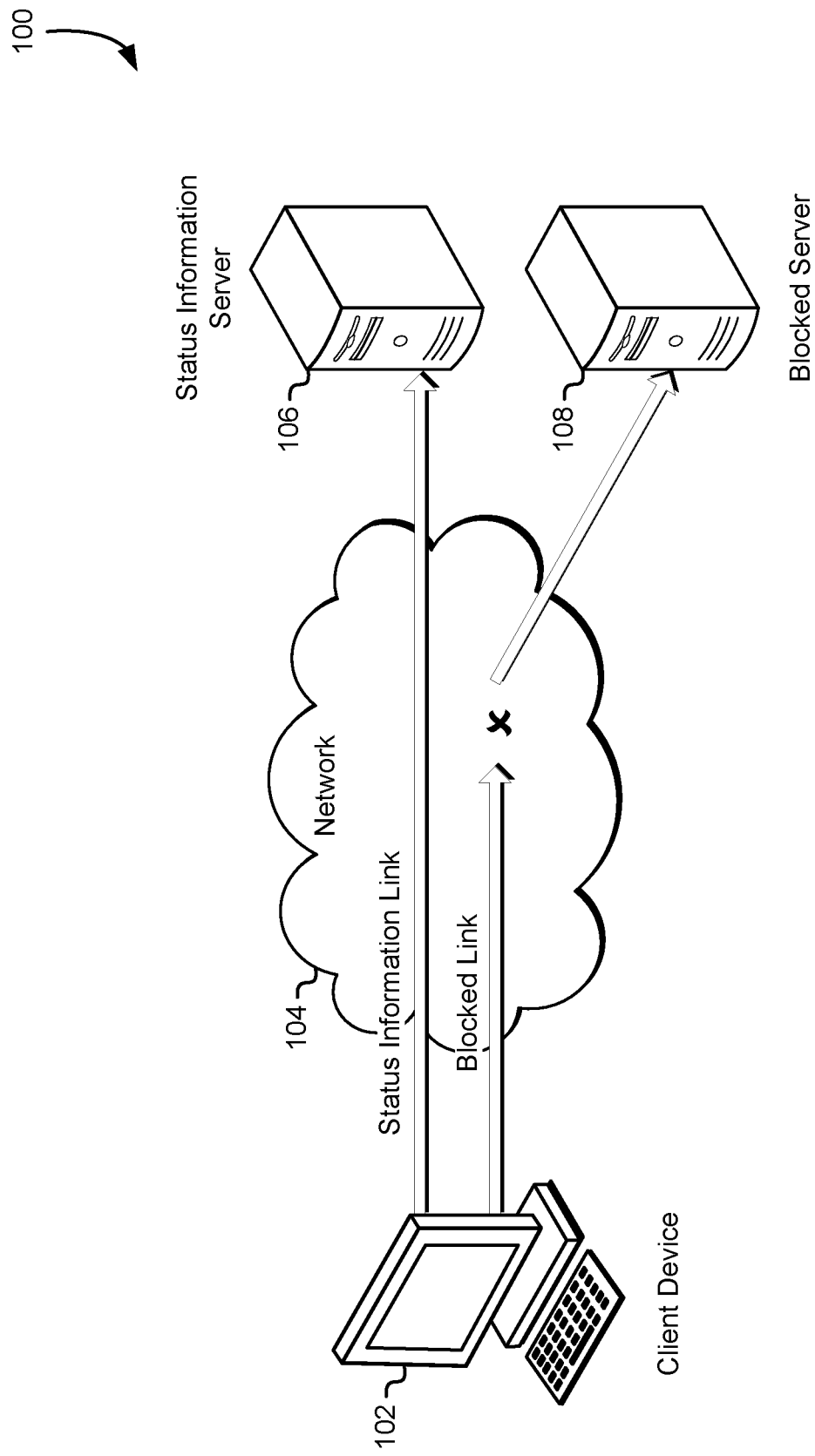
FIG. 1 shows an example of an environment for providing status information to a client device in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include utilizing a first communication link to provide status information about a second communication link. A communication link may traverse a path in a network, whereby the path may have one or more network devices resident on the path. A network device on a network path may, for example, be a router and may route trafficked data to other network devices. The trafficked data may be any type of data, such as bits, Bytes or packets that are organized or structured in accordance with any communications or networking protocol.

In various embodiments, a user device, such as a laptop computer, tablet or smartphone, may seek to communicate using a second communications link. The second communication link may enable the user device to communicate with one or more servers. For example, the second communications link may enable the user device to receive media content, such as audio, video or text, among others, from the one or more servers. A web browsing application or another type of application may be configured to receive the media content and cause the user device to communicate with the one or more servers. For example, the web browser may be configured to access a webpage having content that is at least partially serviced by the one or more servers. Further, a streaming media application may be configured to receive media content from the one or more servers and render the media content to a user. In various embodiments, the retrieved content may be associated with an identity or an address of a server from which the content may be retrieved, whereby the address may be a uniform resource locator. Upon a user initiating browsing or media streaming, the application executed on the user device may be configured to communicate with the one or more servers to retrieve the content.

Based at least in part on properties or attributes associated with the content, a third-party managing a portion of the second communications link may not permit the user device to receive the content. For example, the content may require relatively high bandwidth to deliver to the user device and an Internet service provider may configure a network device resident on the second communications link to prevent the user device from communicating with the one or more servers or discard certain data trafficked between the one or more servers and the user device. Accordingly, the user device may not be able to receive the sought content. In various embodiments, the third-party may identify particular servers or particular host or network addresses as trafficking in data having the attributes and may "blackhole" communication with the one or more servers. Other data traffic of the user device with one or more other servers may not be affected. For example, a first communication link of the user device with the one or more other servers may not be blocked.

As described herein, feature unavailability due to third-party actors may impact a user experience in interacting with or receiving services from a content provider. If a user is not informed of a reason that certain features are unavailable, the user may mistakenly attribute the unavailability of the features to the content provider and not the third-party actors. Further, an application executed may not be aware of the root cause that certain features are not available. The application may only provide the user with a generic cause as to the reason a sought feature is unavailable, such as an inability to establish a connection with a server, and may not apprise the user as to whether a feature is unavailable due to an action by content provider or a third-party. The techniques described herein facilitate providing accurate information to a user as to the reason certain features are unavailable. Further, the techniques described herein improve user experience by providing the user device with alternative ways to receive related media when the user device is blocked from receiving requested media.

An application executed on the user device may be configured to utilize a first communications link to receive status information regarding the second communications link. Further, a server with which the user device communicates over the first communications link may provide the status information to the user device. The server may be responsive to a request for status information by the user device. Further, an application being executed on the user device may be configured to communicate over the first communications link in order to receive the status information. The status information may be dynamically displayed to a user, for example, using any type of screen such as a touch screen. Application code for a webpage, such as hypertext markup language (HTML) or JavaScript, may be configured to request status information over the first communications link. A status information request sent over the first communications link may be addressed to a different destination server than an end server of the second communications link, and the status information request may be submitted to a different uniform resource locator. A dedicated uniform resource locator, such as video.example.com/status may be used to provide status information.

The destination server receiving the status information request may identify that the user device has a blocked second communications link based at least in part on a variety of factors. The server may identify a geographic location (geolocation) of a user device based at least in part on an Internet protocol address of the user device, whereby the Internet protocol address may convey a country, region, organization or Internet service provider of the user device. The server may retain information that indicates whether the identified country, region, organization or Internet service provider blocks certain data. If a positive determination is made, a response may be sent to the user device indicating that certain features may not be received by the user device due to content being blocked. Further, the response may indicate that the blocking is not due to a failure on behalf of the content provider. As described herein, the response may also provide the user with alternative media content that may not be blocked. For example, if the second communications link is blocked due to high bandwidth content, the user may be offered lower bandwidth alternatives.

The request for status information may be routed to different servers depending on whether the request is received from a party (for example, country, region, organization or Internet service provider) that is known to perform or that is suspected of performing blocking content. A server designated to receive status information requests for user devices associated with the party may, by virtue of having received the request, respond with status information indicating that content blocking is being performed. Conversely, a server that is designated to receive status information requests for user devices not associated with the party may respond with an indication that content blocking is not performed.

FIG. 1 shows an example of an environment for providing status information to a client device in accordance with at least one embodiment. In the environment 100, a client device 102, which may be any type of device such as a consumer electronics including a desktop or laptop computer, attempts to communicate over a blocked link to a blocked server 108. A server, as described herein may be any type of device, such as a computer system, that receives requests over a network 104 and responds to the requests. As described herein, the communication may be blocked by a third-party, for example, due to the potential that high bandwidth data being sent or received over from the blocked server 108 over the blocked link. A communication link may be any type of connection over which data may be exchanged between two or more parties. The exchanged data may be routed to or from various network devices (for example, routers) that are resident on the path of the communication link in a network.

A second status information link established between the client device 102 and a status information server 106 may be used to provide the client device 102 with information about the status of the blocked link. For example, the status information may indicate to the client device 102 that the blocked link is in fact blocked. Further, the status information may indicate to the client device 102 a reason for the blocking. The status information may provide more accurate information regarding the blocked connection that would otherwise be available to a user of the client device 102. For example, an application being executed on the client device 102 may simply indicate to a user that communication with the server has failed but may not apprise the user of a detailed reason behind the failure, such as due to data being blocked by a third-party.

Figure 2:
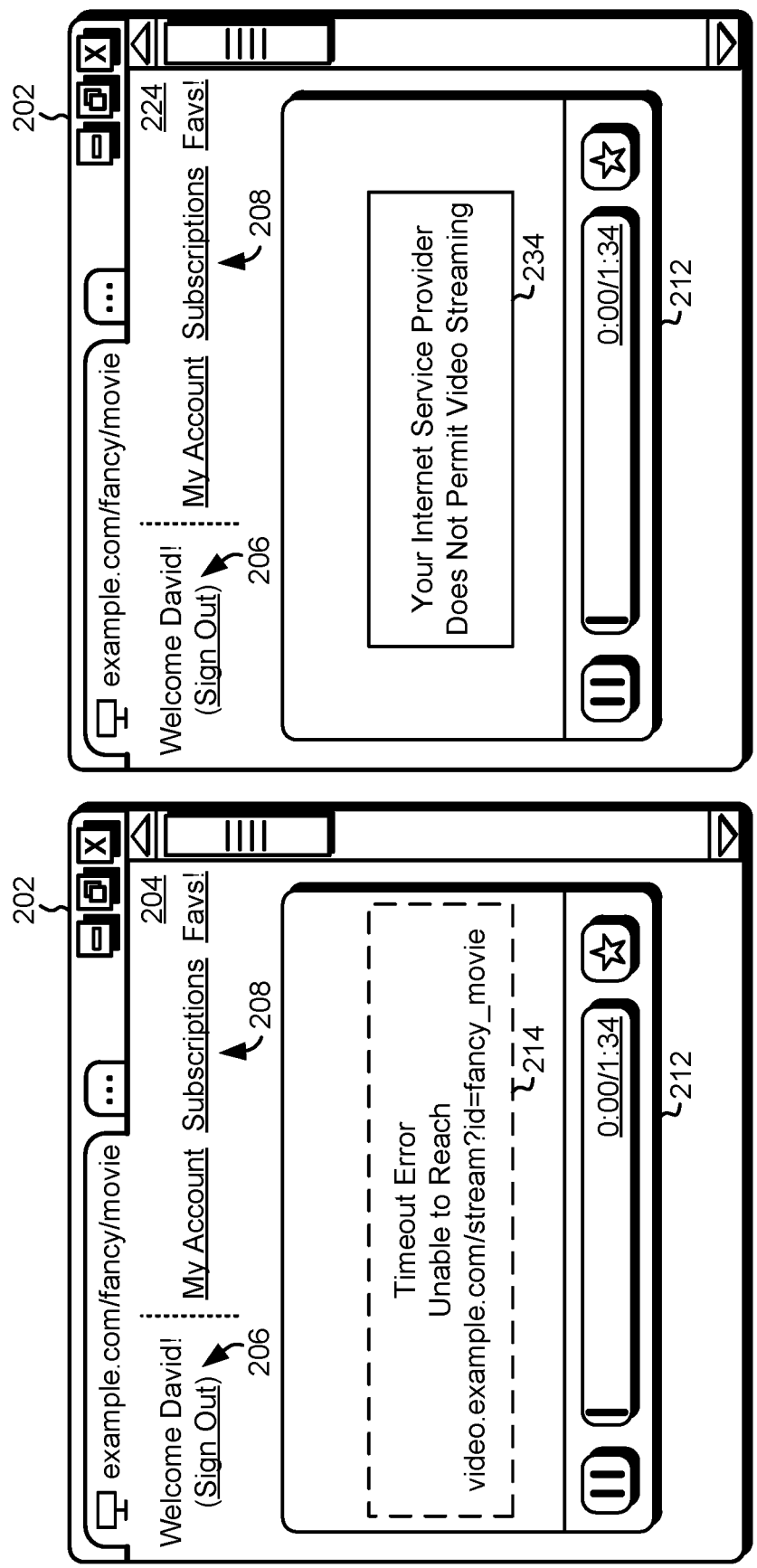
FIG. 2 shows an example of web content received by a web browsing application in accordance with at least one embodiment.

FIG. 2 shows an example of web content received by a web browsing application in accordance with at least one embodiment. A first web browsing application 202 is navigated to a webpage 204. The web browsing application 202 may be executed on a user device (not shown). The user device may be any type of consumer electronics device including a laptop or desktop computer, a tablet, a mobile phone or a smartphone, a smart television, a set-top box or a stream player or a network-enabled digital optical disk player, such as a Blu-Ray™ player or digital versatile disc (DVD™) player, among others. The user device may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The user device may be equipped with a processor, such as a central processing unit (CPU) or a graphics processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user device may also be equipped with one or more input devices, such as a touchscreen that responds to a fingertip or a stylus input, a physical keyboard, a digital camera, a microphone, a touchpad or a mouse, among others. In addition, the user device may also be equipped with one or more output devices such as a screen or speakers. The user device may further be equipped with a global positioning system (GPS) circuitry that enables locating the user device.

The user device may be equipped with memory, such as dynamic or static memory, whereupon one or more executable instructions may be stored that cause the execution of the web browsing application 202 and other applications. The web browsing application 202 may be used to enable the user device to display the webpage 204 that is written or scripted using hypertext markup language (HTML), extensible markup language (XML), JavaScript and the like. The web browsing application 202 may also enable the user to interact with the webpage 204.

The web browsing application 202 permits a user to receive various web content and enable streaming media to the user device including audio, video or any other type of media. The web browsing application 202 permits receipt and rendering of customized user content, such as the welcome message 206 shown in FIG. 2. In addition, the web browsing application 202 allows showing menu options 208 to the user.

The webpage 204 further includes an embedded media player 212. The embedded media player 212 may be configured to receive and process streamed content and cause the streamed content to be rendered on the user device. In some embodiments, the content streamed for the embedded player may have a different uniform resource locator (URL) than the webpage 204 and may be retrieved from a different server or other type of network device than the webpage 204.

An Internet service provider (ISP) or another actor may restrict user access to the server from which the streamed content is received or may restrict communication between the user device executing the web browsing application 202 and the server. For example, Internet service provider may associate streamed content (for example, audio, video or content associated with gaming applications) with high bandwidth usage and may seek to limit the bandwidth used for these purposes. Accordingly, the Internet service provider may disrupt communication between the user device and servers that provide the streamed content. For instance, the Internet service provider may inspect data packets (for example, Internet protocol (IP) packets) that are exchanged between user devices utilizing its communication resources and suspected servers and may fail to deliver the packets to their destination. Furthermore, the Internet service provider may configure its network devices (for example, network routers) not to deliver packets between a user device and the one or more identified servers and use "blackholing" techniques.

Due to the failure in communicating with a server providing the content, the embedded media player 212 notifies the user of the occurrence of an error by display a message 214. The message 214 may indicate that a failure in communication occurred. For example, as shown in FIG. 2, the message 214 indicates that a timeout error occurred and that there was a failure to reach the server. The message 214 may not be descriptive as to apprise the user of the reason content was not received. The message 214 may be generic as to only imply that a communication failure occurred or that the responsible server was not reached. Accordingly, the user may not know where in the communication link between their device and the source of the content the error occurred. The user may, for example, attribute the error to the unavailability of the server of the content provider rather than rather that the Internet service provider is not permitting communication with the server. Further, the user may, based on incomplete information, develop an unfavorable view of the content provider.

A second webpage 224 of the web browsing application 202 is shown in FIG. 2. The second webpage 224 shows similar content as the first webpage 204 with the exception being that the embedded media player 212 of the second webpage 224 shows a second message 234 that is different than the message 214 of the first webpage 204. The second message 234 is generated and shown to the user based at least in part on detecting that the failure to receive content by the user device is attributable to the Internet service provider. For example, the second message 234 may be generated based at least in part on detecting that the Internet service provider or another party that is different from the content provider is disrupting the communication between the user device and a content server.

It is noted that content may be block based at least in part on the source of the content. As shown in FIG. 2, the streamed content (for example, bandwidth intensive content) may be blocked due to the fact that the content originates from one or more servers, which may be identifiable based at least in part on a uniform resource locator associated with the content. Other content of the first webpage 204 and the second webpage 224 may not be blocked due to the fact that is originates from a different server than the streamed content or is associated with the different uniform resource locator than the streamed content. For example, the welcome message 206 and menu options 208 of the first webpage 204 and the second webpage 224 may not be blocked due to the fact that they are associated with a different server than that of the stream content usable by the embedded media player 212.

Figure 3:
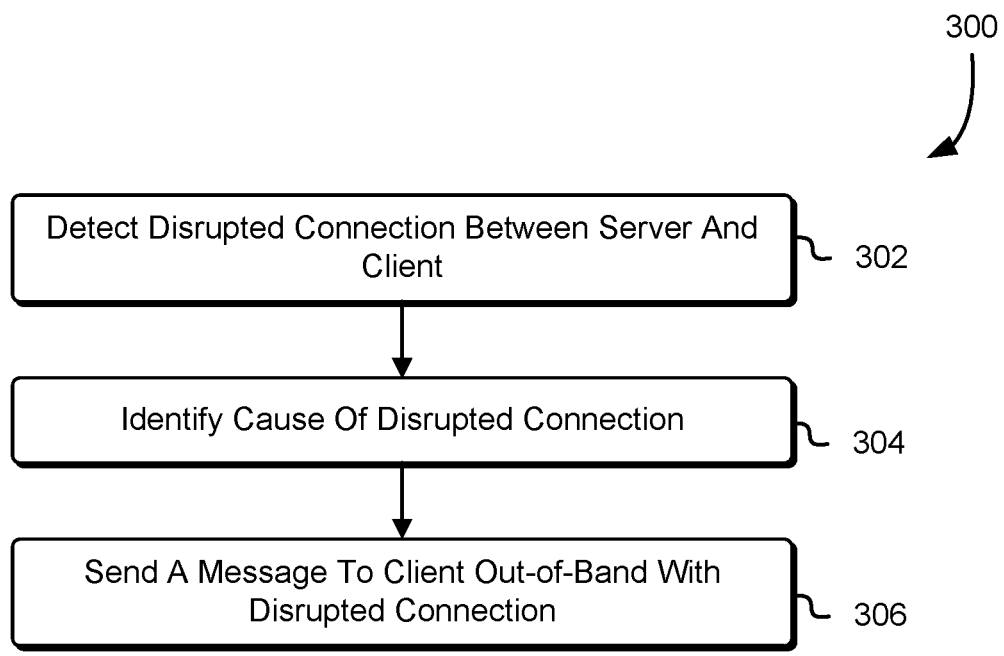
FIG. 3 shows an example of a method for communicating with a client in accordance with at least one embodiment.

FIG. 3 shows an example of a method for communicating with a client in accordance with at least one embodiment. In the process 300, a network device, such as a server, detects 302 a disrupted connection between a server and a client. The client may be a user device, such as a tablet, smartphone or laptop computer, as described herein. A connection may be disrupted by blocking a communication between the server and the client. For example, the flow of traffic or data between the server and the client may be blocked due to the fact that a network device on the path between the server and the client discards or "blackholes" the traffic or data as described herein. The flow of traffic between the server and the client may be blocked due to censorship by a third-party. Further, the flow of traffic may be blocked because a third-party seeks to restrict specific functionality or features. For example, the connection between the server and the client may be used to transmit high bandwidth data and the third-party may seek to restrict bandwidth usage over a network.

The network device then identifies 304 a cause of the disrupted connection. The network device then sends 306 a message to the client out-of-Band with the disrupted connection. The message may provide the client with the reason the connection is disrupted. The message may be sent over a connection or a communications link that is not blocked by the third-party.

Figure 4:
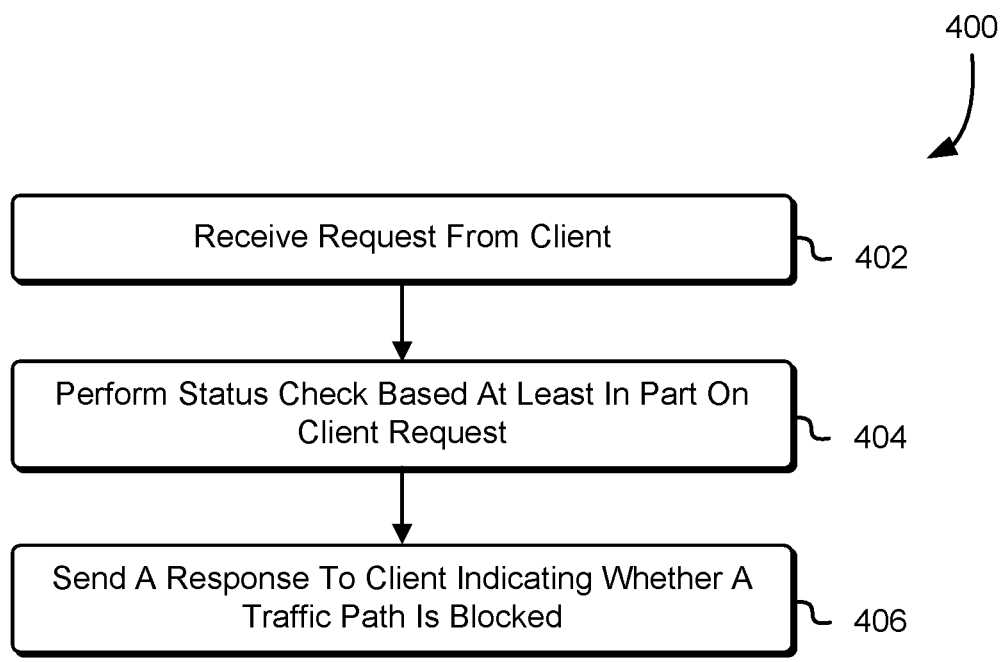
FIG. 4 shows an example of a method for communicating with a client in accordance with at least one embodiment.

FIG. 4 shows an example of a method for communicating with a client in accordance with at least one embodiment. In the process 400, a network device, such as a server, receives 402 a request from a client. The client may be any type of user device as described herein. The request may be a request to perform a status check and the client may be instructed to make the request. For example, the client may include a web browsing application, which may be used to navigate to a website that provides content to the client using a plurality of traffic routes. A first traffic route of the plurality of traffic routes may be blocked by a third-party due to a feature or an attribute of the first traffic route. For example, the first traffic route may be intended to provide high bandwidth content to the client and the third-party may seek to restrict high bandwidth usage. Conversely, a second traffic route of the plurality of traffic routes may not be blocked. For example, the second traffic route may be used to deliver low bandwidth HTML, XML or JavaScript content and the third-party may deem the content associated with the second traffic route permissible.

The third-party may block the first traffic route based at least in part on an identity or address (for example, uniform resource locator) associated with a destination of the first traffic route. For example, it may be known that certain uniform resource locators are used to provide content having certain features or attributes. Accordingly, content destined to or originating from one or more servers associated with the uniform resource locators may be blocked.

The network device receiving the request from the client may be associated with the second traffic route and the network device may not be prevented from communicating with the client. For example, the network device may not be deemed by the third-party as providing content having undesirable attributes. In some embodiments, a client may access seek to access a webpage of a content provider, and the webpage may enable the client to receive a plurality of types of content, a first content type may be blocked and a second content type may not be blocked. As described herein, the two types of content may be received over two different traffic paths. The website may be configured (for example, using appropriately configured HTML, XML or JavaScript instructions) to request that a status check be performed as to whether the first type of content is blocked. Due to the potential blocking of the first traffic path pertaining to the first type of content, the request may be configured to be sent over the second traffic path.

Upon receiving the request from the client, the network device performs 404 a status check to determine whether a traffic path of the client is blocked. The network device then sends 406 a response to the client that indicates whether a traffic path is blocked. The response may be displayed on a screen of the user device.

Figure 5:
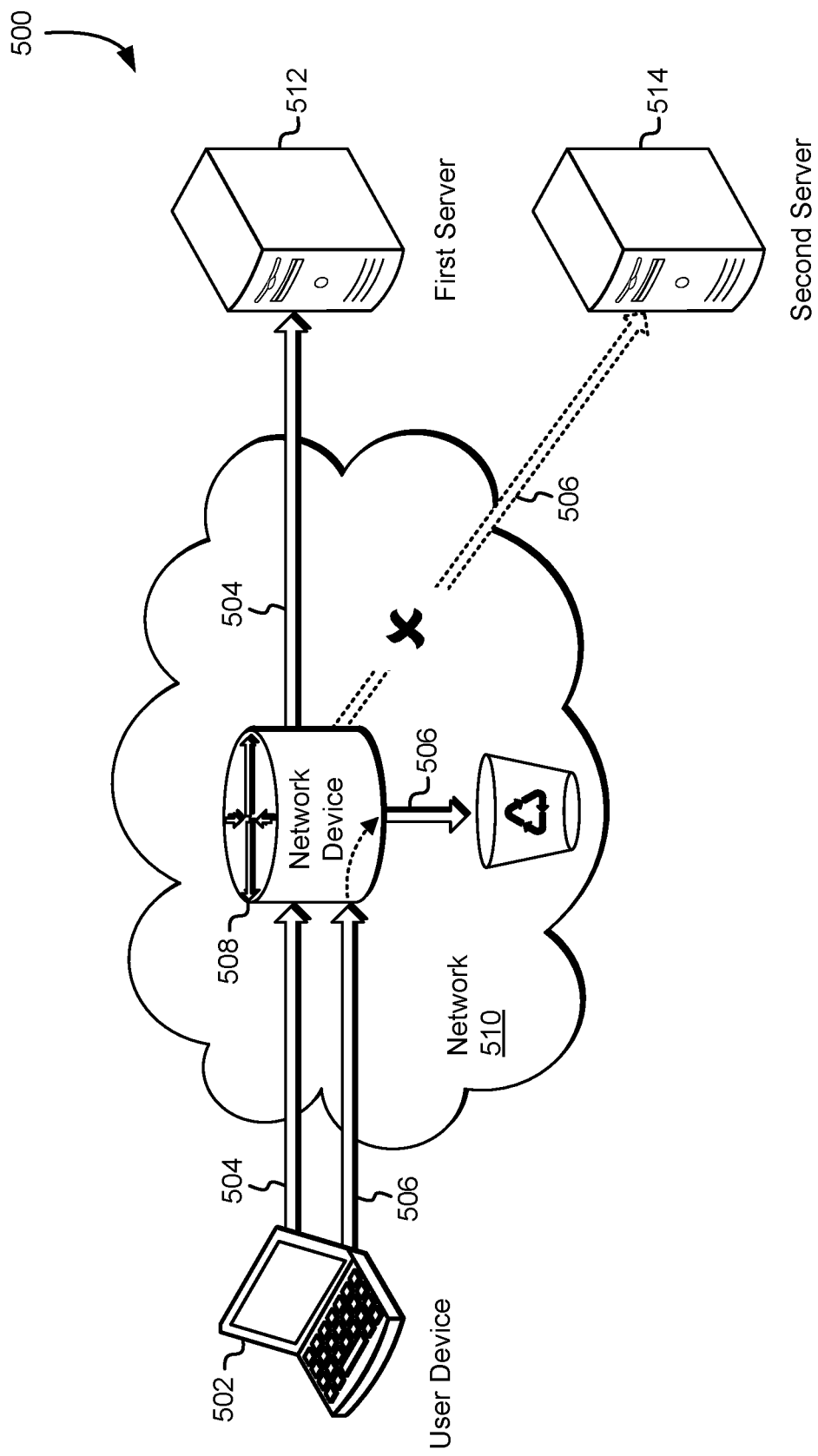
FIG. 5 shows an example of an environment for traffic routing in accordance with at least one embodiment.

FIG. 5 shows an example of an environment for traffic routing in accordance with at least one embodiment. In the environment 500, a user device 502 communicates over a network 510. The network 510 may be a public or private network. Further, various portions of the network 510 may be managed or controlled by various parties or entities. For example, an Internet service provider may manage or control a portion of the network 510 and a content provider may manage or control another portion of the network 510. A first portion of traffic 504 traverses a first path in the network and arrives at a first destination. The first portion of traffic 504 or a second portion of traffic 506 may be any type of data, such as bits, Bytes or packets that are in accordance with any communications or streaming protocol. For example, the first portion of traffic 504 may be Internet protocol or transmission control protocol packets. The second portion of traffic 506 may be in accordance with an International Organization for Standardization (ISO) base media file format and may be streamed using Motion Picture Experts Group dynamic adaptive streaming over HTTP (MPEG-DASH) or HTTP live streaming (HLS).

The first portion of traffic 504 and the second portion of traffic 506 may both be received by a network device 508 that is responsible for routing the first portion of traffic 504 and the second portion of traffic 506 to their respective destinations. The destination may be a device to which the first portion of traffic 504 or the second portion of traffic 506 is addressed. Further, the network device 508 may be an edge or a boundary router. As shown in FIG. 5, the network device 508 routes the first portion of traffic 504 to a first server 512. However, the network device 508 does not route the second portion of traffic 506 to a second server 514, whereby the second server 514 is the intended destination of the second portion of traffic 506.

An operator of the network device 508 may deem that traffic between the second server 514 and the user device 502 to be undesirable and may block a connection between the second server 514 and the user device 502. The network device 508 may discard the second portion of traffic 506 and may, thereby, bar the user device 502 from communicating with the second server 514. The network device 508 may have a list of impermissible traffic destinations, whereby the list may include the second server 514.

Figure 6:
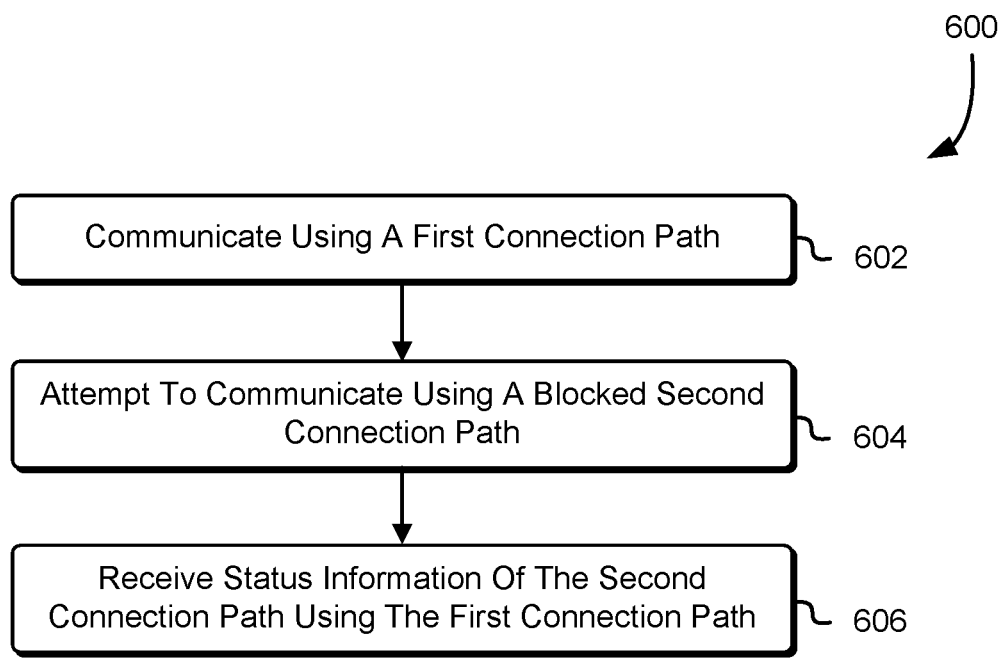
FIG. 6 shows an example of a method for receiving status information for a blocked connection in accordance with at least one embodiment.

FIG. 6 shows an example of a method for receiving status information for a blocked connection in accordance with at least one embodiment. In the process 600, a user device communicates 602 using a first connection path. A connection path may be a route in a network to an Internet protocol address. In a connection path, data (such as bits, Bytes or packets) may be sent from a source to a destination. For example, packet data may be addressed to the destination. The connection path may have various routers that route the data from the source to the destination. A router may forward the data along the connection path to another router until the data arrives at the destination, whereby data may be forwarded along a path based at least in part on a destination address associated with the data (for example, a network or host address). The routers may utilize various conventions to route the data. For example, a router may employ a border gateway protocol (BGP) and may route the data in accordance with the protocol. Further, one or more Domain Name System (DNS) resolution servers may be consulted to determine the routing of the data. Data having different destination addresses may be routed differently. For example, a first data portion having a first destination address may be routed along the first connection path, whereas a second data portion having a second destination address may be routed along a second connection path. As described herein, a router may determine a forwarding destination for a data portion based at least in part on a source or destination address of the data portion, a geolocation of the source or destination or an Internet service provider. Furthermore, because data routing along a connection path may be controlled by various parties, enforced policies of the parties may further dictate the path a data portion takes in a network.

As described herein, the user device may be configured to execute an application, such as a web browsing application or a browser-independent media streaming application, that enables the user device to communicate using the first connection path. As described herein, the first connection path may be established for the purpose of providing status information to the user device on a second connection path. For example, a video streaming application on the user device may be configured to establish the first connection path in order to receive status information associated with the second connection path used for video streaming. Unlike, the second connection path, the first connection path may not be likely to be blocked due to the fact that the first connection path is not used to traffic large amounts of data.

Furthermore, the first connection path may not be established for the sole purpose of providing status information on a second connection path. The first connection path may be used to deliver the status information in addition to other types of data. As described herein, web content for a webpage may be communicated over two different paths, whereby, for example, HTML, XML or JavaScript code may be retrieved over the first connection path and streamed media may be communicated over a second connected path. The first connection path used to deliver non-restricted HTML, XML or JavaScript content may also be used to communicate status requests and status information responses.

The user device then attempts 604 to communicate using a blocked second connection path. As described herein the user device may be barred from communicating using the second connection path and traffic data traversing the path may be discarded. As a result of communicating using the first connection path, the user device receives 606, using the first connection path, status information associated with the second connection path. An application executed on the user device, such as a web browsing application or a video streaming application, may be configured to communicate using the first connection path on a condition that it has been detected that communicating using the second connection path is blocked, and the first connection path may be used to deliver status information.

Figure 7:
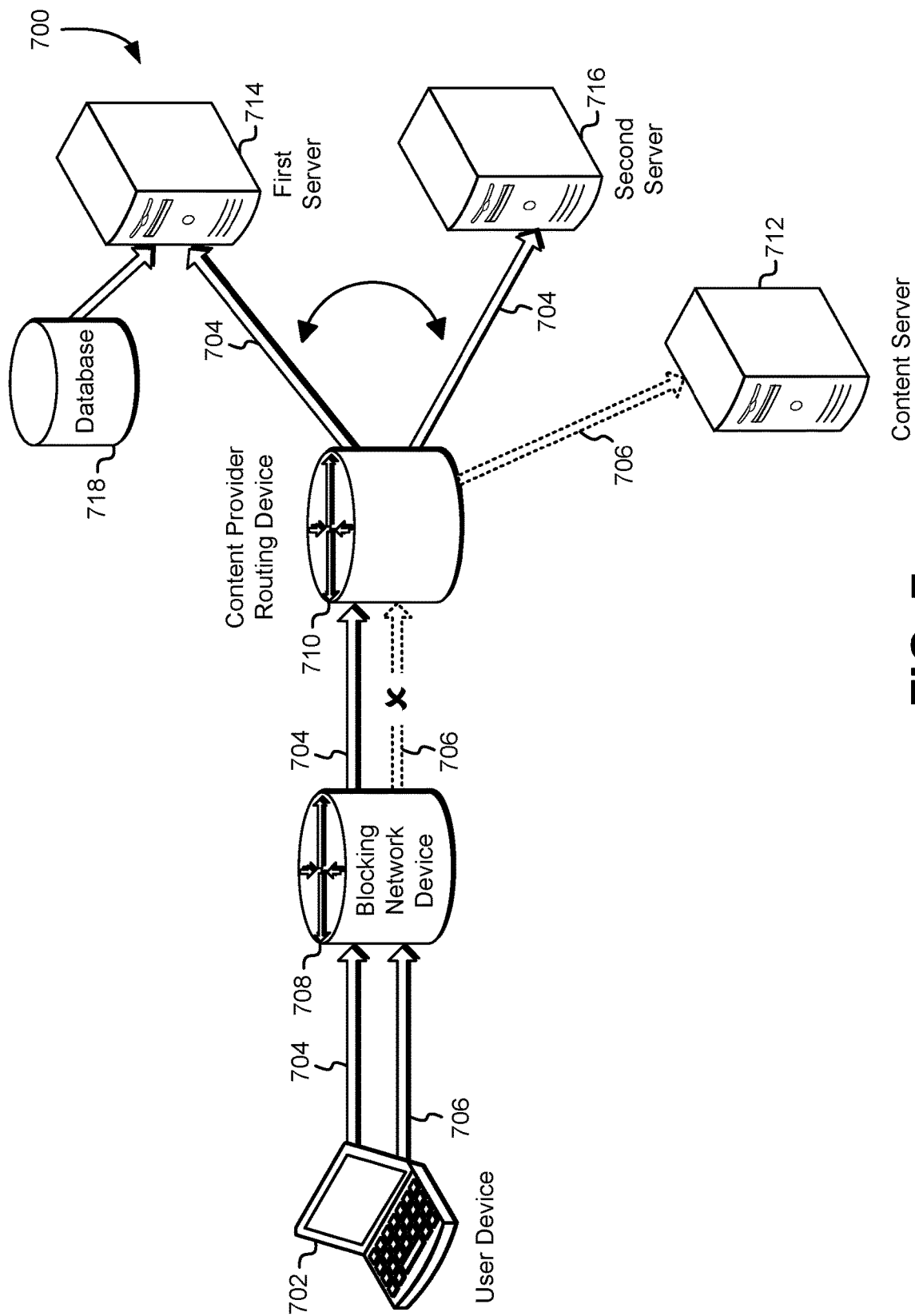
FIG. 7 shows an example of an environment for providing a connection status in accordance with at least one embodiment.

FIG. 7 shows an example of an environment for providing a connection status in accordance with at least one embodiment. In the environment 700, a user device 702 sends or receives data over two paths 704, 706, whereby data traversing the first path 704 may be associated with a first origin or destination address and data traversing the second path 706 may be associated with a second origin or destination address. An origin or destination address may be an Internet protocol network or host address or a uniform resource locator, among others. A blocking network device 708 may be configured to prevent the user device from communicating with a content server 712 and, accordingly, data traversing the second path 706 originating from the user device 702 or the content server 712 may be discarded by the blocking network device 708. The data originating from the user device 702 may not reach the content provider routing device 710. Further, the path between the content provider routing device 710 and the content server 712 may be populated with one or more other routing devices (not shown).

Conversely, data traversing the first path 704 may be permitted to reach its destination and, accordingly, data originating from the user device 702 and traversing the first path 704 may be provided by the blocking network device 708 to the content provider routing device 710 and vice-versa. A content provider may seek to notify the user device 702 of second path 706 being blocked. The content provider may identify one or more third parties that enforce blocking policies. On condition that the content provider routing device 710 receives data over the first path that originates from a blocking network device 708, the content provider routing device 710 may be configured to route the data to a first server 714. The first server 714 may be configured to indicate or notify the user device 702 of the fact that data communicated by the user device 702 traversing the second path 706 is blocked. The first server 714 may be designated to apprise the user device 702 of the status of the user device's 702 second path 706. In addition, the first server 714 may provide any number of services to the user device 702, whereby, the first server 714 may be a web server that provides web content to the user device 702, among others.

The first server 714 may have an associated database 718. The database 718 may be configured to store identities of third-parties that are known to block particular content or identities of network devices controlled or managed by the third-parties. Further, the third-parties may be suspected of performing connection blocking. The network devices may be used by a third-party to block certain connections or network paths due at least in part to the attributes of the data being exchanged over the connections or the network paths. The database 718 and its associated entries may be built or constructed over time based at least in part on observed content blocking. In response to a request for connection status that identifies a third-party or its associated network devices, the first server 714 may consult the database 718 to whether the third-party or its associated network devices are identified as performing content blocking.

Further, on condition that the content provider routing device 710 receives data that does not originate from a network device that is identified as performing content blocking, the content provider routing device 710 may be configured to route the data to a second server 716. The second server 716 may process the data and provide services to the user device 702 as described herein. However, the second server 716 may not be designated with notifying the user device 702, instead, the second server 716 may be configured to evaluate the received data and respond to the user accordingly.

Routing tables, such as border gateway protocol (BGP) routing tables, may be used to route data by the content provider routing device 710. The routing tables may be established based at least in part on known or observed content blocking activity. For example, if data originates from a network where content blocking is identified or suspected as taking place, the data may be routed to a first server 714 as opposed to the second server 716. If the user device 702 submits a status request to a permitted uniform resource locator, such as video.example.com/status, as configured by application code and the request it routed to the first server 714, the first server 714 may respond with an indication that the user's content is being blocked. Conversely, if the status request is received by the second server 716, the second server 716 may respond with an indication that the functionality on the second path 706 is enabled.

In alternative embodiments, the content provider routing device 710 may route a request to perform a status check to a sub-domain of one or more servers, and the one or more servers may respond to the request based at least in part on information available to the one or more servers. For example, the user device 702 may identify in the request their Internet service provider or other information, such as the country from which their traffic originates, and the one or more servers may evaluate to the request to determine whether content blocking is performed and respond to the request accordingly. In such embodiments, it may not be necessary for the content provider routing device 710 to route traffic to the first server 714 or the second server and the content provider routing device 710 may route all traffic to the sub-domain of one or more servers.

In other embodiments, the one or more servers of the sub-domain may determine based at least in part on an Internet protocol address associated with the request or other information, a third-party that controls or manages the first path 704 of the user device 702. Based at least in part on retained information that indicates whether content blocking is performed by the third-party, the one or more servers may respond to the request with appropriate status information.

In some embodiments, the first path 704 may be used to provide the user device with related media content to the media whose receipt has been blocked. For example, if the user device 702 is denied streaming a newscast because of bandwidth restrictions, the first path may be used to provide the user device with a transcript of the newscast or another avenue to engage the user. For example, the transcript may be dynamically loaded and shown on the user device 702 or the user device 702 may be provided with a uniform resource locator to obtain the transcript. In various embodiments, low-bandwidth media content may be provided to supplement the blocked content. For example, an electronic book, fan fiction collection, among others may be provided or information about obtaining this content may be provided. In various embodiments, it may not be desirable to use the first path 704 to provide the blocked content as the third-party may cause the first path 704 to be blocked as well, for example, due to the first path 704 being now used to deliver high-bandwidth content. The related media content may be provided in addition to or as an alternative to the status information provided to the user device.

Figure 8:
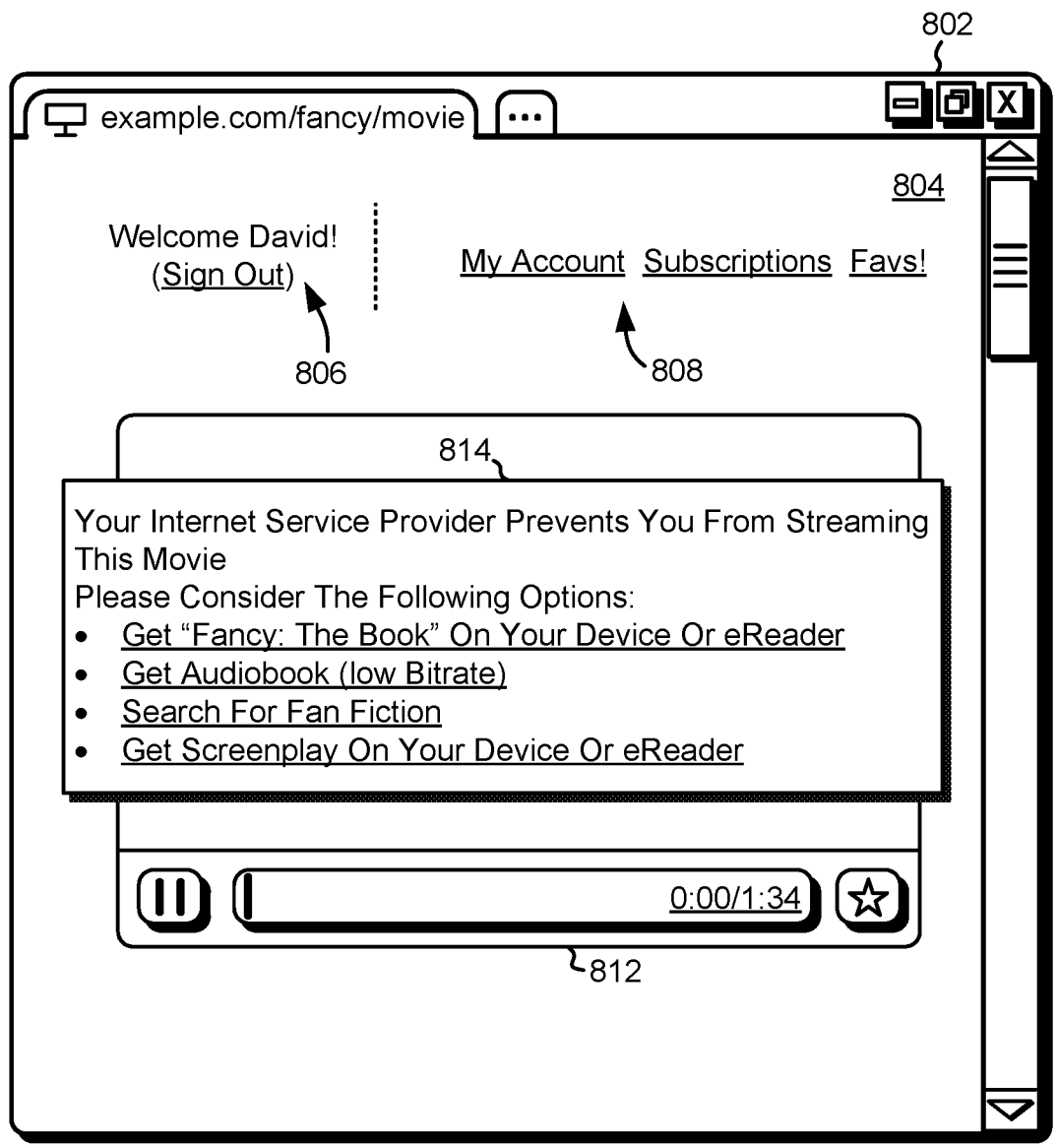
FIG. 8 shows an example of providing secondary content to a web browsing application in accordance with at least one embodiment.

Identifying a third-party that controls or manages a traffic route may be performed using custom Domain Name System routes. A Domain Name System resolution service may be used to put in place custom routes for various third-parties. For example, traffic that originates from one third-party may be routed to a first fleet of servers, whereas traffic that originates from another third-party may be routed to a second fleet of servers. The first fleet of servers handling traffic from a blocking third-party may be configured to respond with status information whereas the second fleet of servers may be configured to respond with a "go-ahead" message indicating that another connection is not blocked or that the other connection is capable of providing the sought after functionality. FIG. 8 shows an example of providing secondary content to a web browsing application in accordance with at least one embodiment. A web browsing application 802 is navigated to a webpage 804. As described herein, the web browsing application 802 may be executed on a user device (not shown), which may, for example, be any type of consumer electronics device. The web browsing application 802 enables a user to receive content from a server over an established connection. Further, the web browsing application 802 may enable streaming media, including audio, video or any other type of media, to the user device. The web browsing application 802 enables receipt and rendering of customized user content, such as the welcome message 806. In addition, the web browsing application 802 enables menu options 808 to be rendered on the user device. Although a web browsing application is described with reference to FIG. 8, it may be contemplated than any other application may be used for providing secondary content to the user device.

The webpage 804 further includes an embedded media player 812. The embedded media player 812 may be configured to receive and process streamed content and cause the streamed content to be rendered on the user device. In some embodiments, the content streamed for the embedded player may have a different uniform resource locator (URL) than the webpage 804 and may be retrieved from a different server or other type of network device than the webpage 804. As described herein, an Internet service provider (ISP) or another actor may restrict user access to the server from which the streamed content is received or may restrict communication between the user device executing the web browsing application 802 and the server.

In addition to or in-lieu of providing a message indicating the reason that the user device may not receive the content, a reference to or an indication of secondary content may also be provided. The secondary content may be related to the blocked content and in various embodiments may serve to supplant the blocked content or as substitute for the blocked content. Providing the secondary content to the user may be advantageous in it may offer some gratification to the user when the user is denied the blocked content. As shown in FIG. 8, a message 814 is provided to the user device indicating a reason the content is not received by the user device. Further, the message 814 provides a plurality of URIs associated with secondary content. If receiving a high-bandwidth motion picture is subject to blocking by an ISP or another third-party, the message 814 refers the user to secondary content and provides the user with ways to obtain the secondary content. In FIG. 8, the secondary content is shown to include a book on which the motion picture is based or a narrated audiobook. The audiobook may have a low bitrate, and due at least in part to the low bitrate, the audiobook may not be subject to being blocked. Further, the message 814 may direct to the user to search for fan fiction associated with the motion picture or may provide the user with the option to obtain a screenplay of the motion picture on the user device or another device.

As described herein, the secondary content may have one or more features or attributes that are different than those of the blocked content, whereby the one or more features or attributes may cause the secondary content to be excluded from blocking. In various embodiments, the secondary content may be associated with lower bandwidth usage than the blocked content. Accordingly, if a third-party implements bandwidth usage restrictions, the secondary content may be more likely to be excluded from the restrictions.

Figure 9:
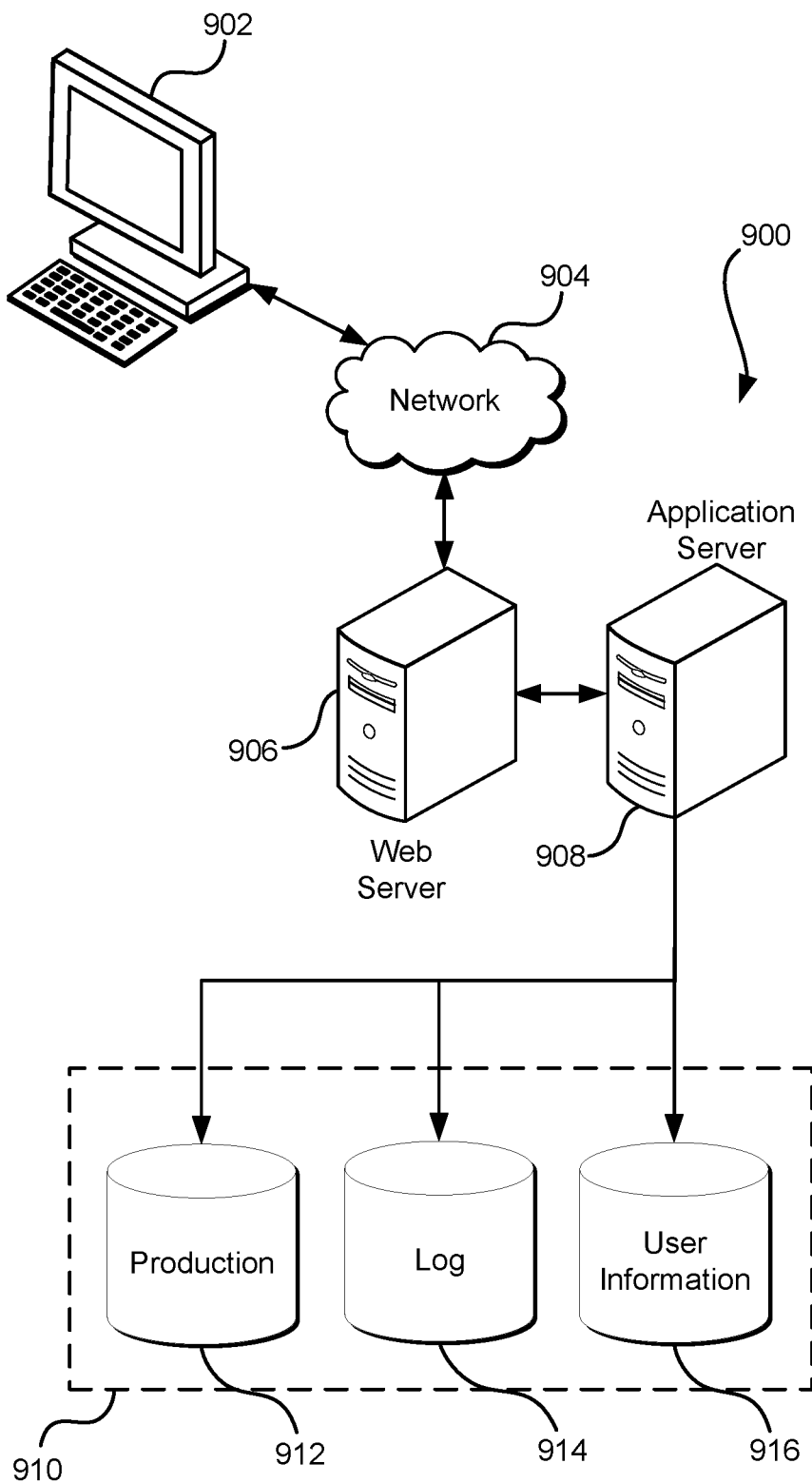
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request over a first connection path, the request corresponding to a second connection path that is subject to blocking by a third-party and the request including metadata that specifies the identity of the third-party controlling a routing device of one or more routing devices of the first connection path;
   determining to route the request to a first server, the determining being based at least in part on the identity of the third-party controlling the routing device of the one or more routing devices of the first connection path specified by the metadata of the request; and
   routing the request to the first server.

2. The computer-implemented method of claim 1, wherein the request is obtained from a user device and wherein the second connection path is used by the user device.

3. The computer-implemented method of claim 1, wherein the request includes a connection status request and wherein the first server provides connection status information in response to the connection status request.

4. The computer-implemented method of claim 3, wherein the connection status information indicates that the second connection path is blocked.

5. The computer-implemented method of claim 1, wherein a user device is blocked from obtaining a first set of content over the second connection path and wherein the method further includes routing to the user device, in response to the request, a second set of content related to the first set of content that the user device is blocked from obtaining over the second connection path.

6. The computer-implemented method of claim 1, wherein the metadata that specifies the identity of the third-party controlling the routing device of the one or more routing devices of the first connection path is used by the first server to respond to the request.

7. A system, comprising at least one computing device that implements one or more services, wherein the one or more services:
   obtain a request over a first communication link, the first communication link traversing a first path in a network, the request indicating via metadata an identity associated with a third-party that controls one or more network devices traversed by a second communication link and at least one device of the one or more network devices that blocks communication over the second communication link; and
   in response to the request, send, to a client device, status information of the second communication link, the status information of the second communication link determined based at least in part on the identity associated with the third-party indicated by the metadata.

8. The system of claim 7, further comprising identifying the second communication link based at least in part on the obtained request and determining the status information of the second communication link based at least in part on identifying the second communication link.

9. The system of claim 7, wherein the status information of the second communication link indicates that the second communication link is blocked by a network device of the one or more network devices traversed by the second communication link.

10. The system of claim 7, wherein:
    the first communication link is routed via one or more third-party controlled network devices and one or more content provider network devices; and at least one content provider network device of the one or more content provider network devices routes the first communication link to the one or more services based at least in part on identifying the third-party or identifying at least one third-party controlled network device of the one or more third-party controlled network devices.

11. The system of claim 10, wherein a routing table of the at least one content provider network device of the one or more content provider network devices is used to route the first communication link to the one or more services.

12. The system of claim 7, wherein the status information of the second communication link indicates that the second communication link is blocked due at least in part to traffic associated with the second communication link exceeding a bandwidth usage threshold.

13. The system of claim 7, wherein the one or more services send, to the client device, secondary content associated with content that is blocked from the client device on the second communication link.

14. A non-transitory computer-readable storage medium comprising executable instructions that, as a result of being executed by one or more processors of a computer system, cause the computer system to at least:
send a request indicating an identity associated with a third-party that controls one or more network devices of a second network path;
obtain, in response to the request, content associated with information accessible over the second network path; and
determine, based at least in part on the content and the identity associated with the third-party indicated by metadata, that a communication using the second network path has been blocked.

15. The non-transitory computer-readable storage medium of claim 14, wherein determining that the communication using the second network path has been blocked is based at least in part on data obtained from a first server over a first network path that is different from the second network path, the data indicating that communication using the second network path is blocked.

16. The non-transitory computer-readable storage medium of claim 15, wherein the instructions further comprise instructions that, as a result of being executed by the one or more processors, cause the computer system to:
send a second request indicating the identity associated with the third party that controls the one or more network devices of the second network path; and
obtain from the first server an indication that communication using the second network path is restored and is no longer blocked.

17. The non-transitory computer-readable storage medium of claim 14, wherein the request includes a request for obtaining the content over the second network path.

18. The non-transitory computer-readable storage medium of claim 14, wherein the identity is usable for determining that communication using the second network path is blocked.

19. The non-transitory computer-readable storage medium of claim 14, wherein the instructions further comprise instructions that, as a result of being executed by the one or more processors, cause the computer system to:
provide an indication to a user of the computer system of the communication using the second network path being blocked, the indication to the user identifying the third-party as causing blocking of the communication or an indication of an attribute of the communication that is subject to blocking by the third-party.

20. The non-transitory computer-readable storage medium of claim 14, wherein the instructions further comprise instructions that, as a result of being executed by the one or more processors, cause the computer system to, in response to receiving the request, send, to a client device, status information of the second network path indicating that the second network path has been blocked.

* * * * *